(12) United States Patent
Leblanc et al.

(10) Patent No.: US 6,746,203 B2
(45) Date of Patent: Jun. 8, 2004

(54) GRIPPING AND TRANSPORT CLAMP MOUNTED AT THE END OF A ROBOTIC ARM AND METHOD FOR OPERATING THE SAME

(75) Inventors: Paul Leblanc, Montréal (CA); Sylvain-Paul Morency, Fabreville (CA); Dominic Prevost, Bois des Filions (CA); Sylvain Boily, Boucherville (CA)

(73) Assignee: Axium, Inc., Quebec (CA)

( * ) Notice: Subject to any disclaimer, the term of this patent is extended or adjusted under 35 U.S.C. 154(b) by 0 days.

(21) Appl. No.: 09/953,495

(22) Filed: Sep. 14, 2001

(65) Prior Publication Data

US 2002/0154986 A1 Oct. 24, 2002

Related U.S. Application Data

(60) Provisional application No. 60/279,742, filed on Mar. 30, 2001.

(51) Int. Cl.⁷ .............................................. B65G 59/02
(52) U.S. Cl. .................... 414/796.9; 294/907; 414/907; 414/929; 414/801
(58) Field of Search .................... 294/907; 414/796, 414/796.9, 801, 802, 907, 929; 901/46, 47

(56) References Cited

U.S. PATENT DOCUMENTS

| 4,911,608 | A | * | 3/1990 | Krappitz et al. ............. 414/796 |
| 4,993,915 | A | | 2/1991 | Berger et al. ............. 414/796.8 |
| 5,102,292 | A | * | 4/1992 | Brinker et al. ............... 414/796 |
| 5,169,284 | A | | 12/1992 | Berger et al. ............. 414/796.9 |
| 5,582,504 | A | * | 12/1996 | Cestonaro ................. 414/796.9 |
| 6,332,750 | B1 | * | 12/2001 | Donner et al. ........... 414/796.9 |

* cited by examiner

*Primary Examiner*—Janice L. Krizek
(74) *Attorney, Agent, or Firm*—Merchant & Gould P.C.

(57) ABSTRACT

The present invention relates to a gripping and transport clamp mounted at an end of a robotic arm. The clamp has a support member mounted at the end of the robotic arm and two lower pressing plates and one upper pressing plate mounted on the support member. A sensor is used to detect a reaction force being exerted on the first pressing plate upon displacement thereof. An actuator inserts the first lower pressing plate under the object to be gripped in response to a detection of the reaction force by the sensor. The second lower pressing plate under the first pressing plate moves between a retracted position and an extended position by means of an actuator mounted between the second lower pressing plate and the support member. It is also inserted under the object to be gripped. An actuator moves the upper pressing plate towards the object for gripping it between the plates. A controller receives detection signals from the sensor and operates the actuators.

14 Claims, 6 Drawing Sheets

GRIPPING AND TRANSPORT CLAMP MOUNTED AT THE END OF A ROBOTIC ARM AND METHOD FOR OPERATING THE SAME

This application claims the benefit of Provisional Application No. 60/279,742, filed Mar. 30, 2001.

FIELD OF THE INVENTION

The present invention relates to a depalletizing tool for an industrial robot, and more particularly to a gripping and transport clamp mounted at the end of a robotic arm. Furthermore, the present invention also relates to a method for operating the above-mentioned depalletizing tool.

BACKGROUND OF THE INVENTION

Several manufacturing industries need to pack their product into boxes. These boxes are often shipped by the manufacturers, in an unfolded and stacked manner, on pallets. The piles of boxes need to be handled manually in order to transfer them from the pallet to a machine whose function is to form the boxes and to insert the product therein. The main problems to which are confronted these industries are the costs related to the use of manual labor and the industrial illnesses related to the repetitive handling of moderately heavy loads. Confronted to this type of problem, industrialists are turning themselves more and more towards automated solutions which replace human beings by an automated system.

An automated solution is generally defined as a set of mechanisms governed by a control system accomplishing a specific functionality. There exist on the market specialized systems capable of accomplishing depalletization work but only under very specific constraints. These constraints are such that the industries must consider robotized solutions which are much less constraining.

A robotized solution is defined as a system using an industrial robot with at least four degrees of freedom, as well as a tool specifically designed to be affixed on the robot and accomplish a very well defined task. There exist on the market robotized solutions capable of accomplishing depalletization work but the latter have certain constraints. These constraints are:

- the pallets must always be placed at the same location;
- the set of articles on the pallet must always be at the same location on the pallet;
- the articles must be of the same dimension;
- the piles of articles must be fastened individually, or the article must be a formed box; and
- the tool of the robot or the downstream machine must remove the fasteners of the piles and dispose adequately of the fasteners (e.g. straps).

One can find on the market vision systems allowing the digitalization of objects in three dimensions. It is possible to adapt such a system to an industrial robot tool and to produce a computer program capable of processing the digital images and allowing a tridimensional tracing. Unfortunately, the costs involved would be prohibitive for an industrial application intended for a very competitive market.

Prehension is a very complex function even for human beings and there is no industrial robot tool presently on the market which is capable of carrying out, at a reasonable cost, such a complex task while remaining independent of the physical dimensions of the articles.

Known in the art, are, for example, U.S. Pat. Nos. 4,993,915 and 5,169,284 by Berger disclosing a row of claws for unstacking objects pilled up on a pallet. The claws are mounted on a carriage assembly movable horizontally on a guide rail. However, the use of this carriage assembly and guide rail reduces the independence with respect to the physical dimension and positioning of the articles.

SUMMARY OF THE INVENTION

A first object of the present invention is to provide a depalletizing tool for an industrial robot and method for operating the same which satisfy some of the above-mentioned needs and which are thus an improvement over what is known in the prior art.

According to the present invention, there is provided a gripping and transport clamp mounted at an end of a robotic arm being movable towards an object to be gripped, comprising:

- a support member mounted at the end of the robotic arm;
- a first lower pressing plate mounted on the support member, the first lower pressing plate being shaped for insertion under the object to be gripped;
- sensor means adapted for detecting a reaction force being exerted on the first pressing plate upon displacement thereof;
- first actuating means for inserting the first lower pressing plate under the object to be gripped in response to a detection of the reaction force by the sensor means;
- a second lower pressing plate mounted below the first lower pressing plate on the support member, the second lower pressing plate being movable between a retracted position and an extended position;
- second actuating means mounted between the second lower pressing plate and the support member for moving the second lower pressing plate between the retracted position and the extended position, thereby inserting the second lower pressing plate under the object to be gripped in response to the first lower pressing plate being inserted under the object to be gripped;
- an upper pressing plate mounted on the support member, the upper pressing plate being movable toward the object to be gripped between an open position and a gripping position;
- third actuating means mounted between the upper pressing plate and the support member for moving the upper pressing plate between the open position and the gripping position, thereby gripping the object between the upper and lower pressing plates; and
- control means for receiving detection signals from the sensor means and for operating the actuating means.

According to the present invention, there is also provided a method for gripping an object with a clamp mounted at an end of a robotic arm, the clamp having a first lower pressing plate and second lower pressing plate below the first lower pressing plate, and an upper pressing plate, the method comprising the steps of:

- sequentially moving the end of the robotic arm in horizontal step movements toward the object to be gripped and in vertical up and down step movements until the first pressing plate touches a separator positioned under the object to be gripped;
- inserting the first lower pressing plate under the object to be gripped;
- inserting the second lower pressing plate under the object to be gripped after the first lower pressing plate has been inserted under the object to be gripped; and lowering the upper pressing plate toward the object to be gripped, thereby gripping the object between the upper and lower pressing plates.

According to the present invention, there is also provided a method for gripping an object with a clamp mounted at an end of a robotic arm, the clamp having a first lower pressing plate and second lower pressing plate below the first lower pressing plate, and an upper pressing plate, the method comprising the steps of:

moving the end of the robotic arm toward the object to be gripped until the first pressing plate is in proximity of the object to be gripped;

partially inserting the first lower pressing plate under the object to be gripped;

detecting if a reaction force exerted on the first lower pressing plate is below a predetermined threshold;

further inserting the first lower pressing plate under the object to be gripped if the reaction force exerted on the first lower pressing plate is below the predetermined threshold;

inserting the second lower pressing plate under the object to be gripped after the first lower pressing plate has been further inserted under the object to be gripped; and lowering the upper pressing plate toward the object to be gripped, thereby gripping the object between the upper and lower pressing plates.

The invention as well as its numerous advantages will be better understood by the following non-restrictive description of a preferred embodiment made in reference to the accompanying drawings.

DETAILED DESCRIPTION OF THE OF THE INVENTION

In the following description, the same numerical references refer to similar elements. The embodiments shown in the figures are preferred.

Moreover, although the present invention is preferably designed for use with an industrial robot for depalletizing purposes, it could be used with other types of objects of different fields for other purposes, e.g. sorting applications, etc., as apparent to a person skilled in the art. For this reason, expressions such as "depalletizing" and/or "articles" and any other references and/or other expressions equivalent thereto should not be taken as to limit the scope of the present invention and include all other objects with which the present invention could be used and may be useful.

Furthermore, it is to be understood that the expression "articles" as used in the context of the present description refers to various different objects which may be used with the present invention, whether these objects are of substantially 2-D and 3-D form, such as metal sheets, cardboards, unfolded boxes, formed boxes, plastic containers, etc., as apparent to a person skilled in the art.

Figure 1:
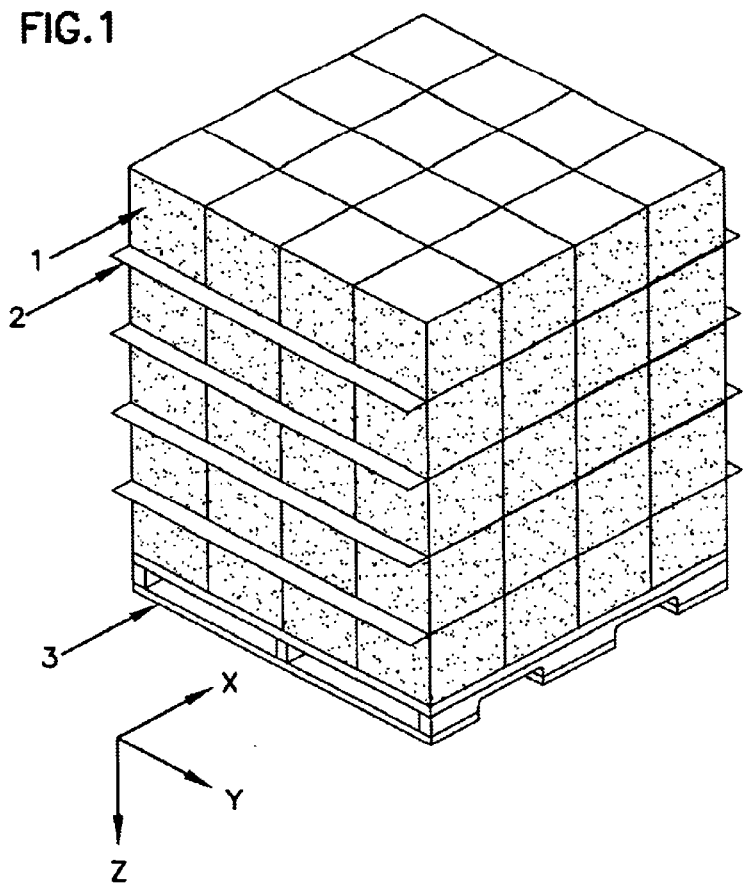
FIG. 1 is a perspective view of a pile of articles stacked on a pallet that are to be gripped with a clamp mounted on a robotic arm according to a preferred embodiment of the present invention.

Referring to FIG. 1, there is shown a preferred pile of articles 1 that are to be handled by a gripping and transport clamp 20 (shown in FIG. 7) of the present invention. These articles 1 are stacked one over the other on a pallet 3, without fasteners, and separated into layers by means of separators 2 used mostly to add stability to the set of articles 1 on the pallet 3. The separators 2 preferably exceed on the side of the pile facing the clamp 20 by about an inch. It is also preferable that the piles not be too inclined or twisted.

Figure 7:
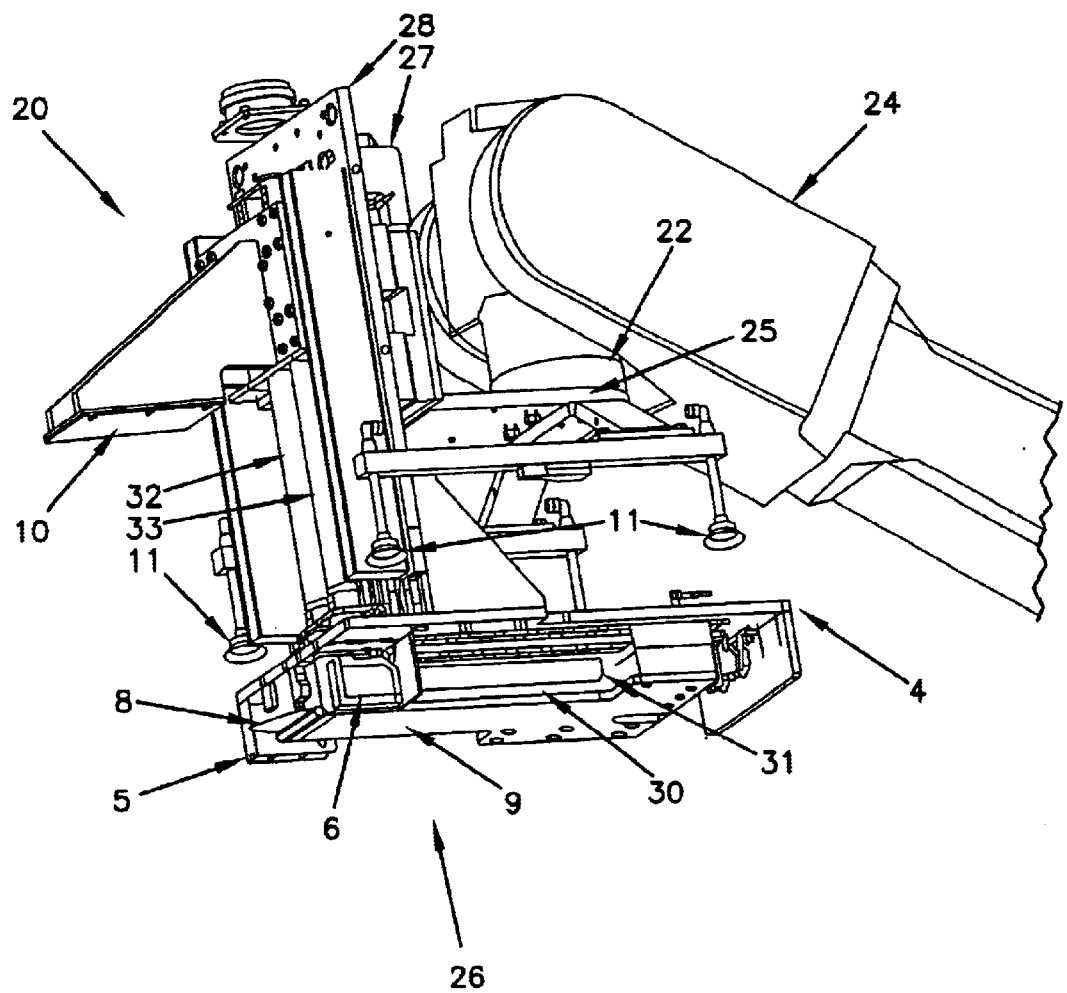
FIG. 7 is a perspective view of the clamp shown in FIG. 2, mounted at the end of a robotic arm, said clamp being shown in its entirety.

Referring to FIG. 7, there is shown the gripping and transport clamp 20 mounted at an end 22 of a robotic arm 24 according to a preferred embodiment of the present invention. The robotic arm 24 is designed so as to be movable towards the object to be gripped, such as the article 1 shown in FIG. 1. The clamp 20 is held by a support plate 25, which is mounted at the end 22 of the robotic arm 24. As it will be further described below, the clamp 20 is mainly formed of two superposed lower pressing plates 8, 9 and an upper pressing plate 10, which are mounted on support members 26.

Figure 2:
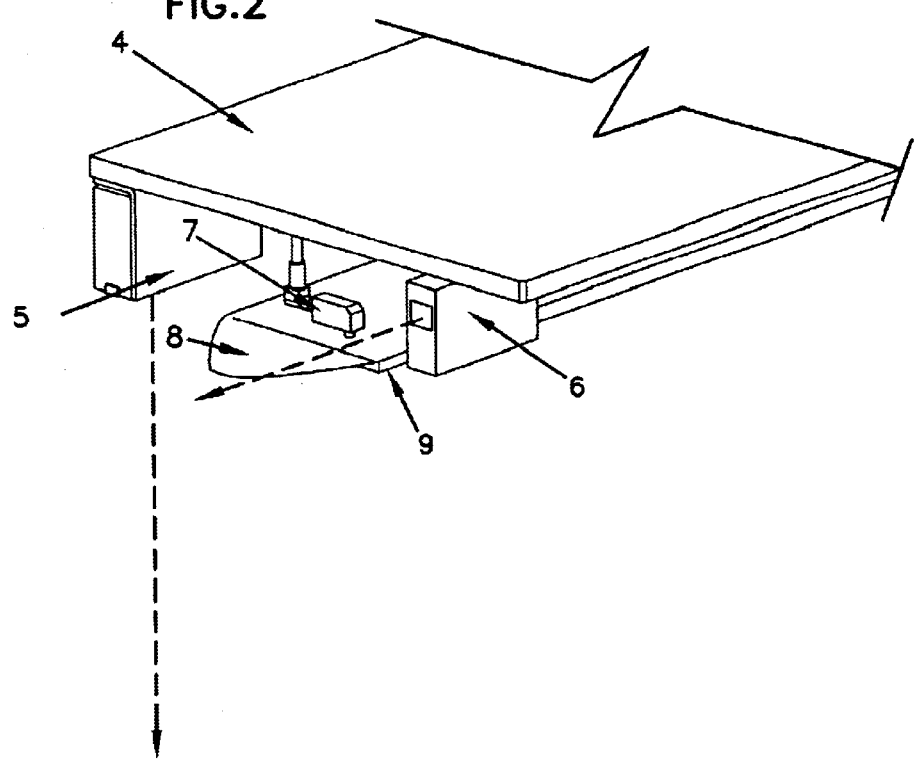
FIG. 2 is a perspective view of a portion of the clamp according to a preferred embodiment of the present invention.

Referring to FIG. 2, the first lower pressing plate 8 is shown mounted on a support plate 4, which is part of the support members 26 holding the clamp 20. The lower pressing plate 8 is shaped so that it can be inserted under the object 1 to be gripped. For example, the lower pressing plate 8 can have the shape of a spatula and it is preferably made of a flat, thin and flexible metal plate. However, the lower pressing plate 8 may have other suitable shapes, such as forks, arms, claws, etc.

Adjacent to the lower pressing plate 8, there is shown a sensor 7 that is adapted for detecting a reaction force that is exerted on the lower pressing plate 8 upon displacement thereof. Preferably, the sensor 7 is a tactile sensor that detects a deformation of the lower pressing plate 8 when it touches an obstacle. In particular, the tactile sensor can be an inductive proximity sensor. As will be described below, the preferred purpose of the tactile sensor is to detect the presence of the separator 2 between the articles 1.

An actuator, such as a pneumatic cylinder and piston arrangement 30 (see FIG. 7), is used for inserting the lower pressing plate 8 under the object 1 to be gripped in response to a detection of the reaction force by the sensor 7. Preferably, the actuator 30 is mounted between the lower pressing plate 8 and the support plate 4 so as to move the lower pressing plate 8 between a retracted position and an extended position. At the extended position, the lower pressing plate 8 is inserted under the object 1 to be gripped. Of course, those skilled in the art will appreciate that the same can be accomplished without the lower pressing plate 8 being retractable as this same insertion movement can also be done by means of a forward displacement of the robotic arm 24. The purpose of the first lower pressing plate 8 is to slightly lift the object 1 to be gripped in order to slide in the second lower pressing plate 9.

The second lower pressing plate 9 is mounted below the lower pressing plate 8 on the support plate 4. This lower pressing plate 9 is movable between a retracted position and an extended position by means of another actuator, such as a pneumatic cylinder and piston arrangement 31 (see FIG. 7), that is mounted between the lower pressing plate 9 and the support plate 4. This actuator 31 moves the lower pressing plate 9 between the retracted position and the extended position, and thereby inserts the lower pressing plate 9 under the object 1 to be gripped in response to the lower pressing plate 8 being inserted under the object 1 to be gripped. As will be appreciated by those skilled in the art, the second lower pressing plate 9 should be rigid enough to support the weight of the object 1 to be gripped and preferably be shaped in the form of a spatula. Also, the second lower pressing plate 9 may have other suitable shapes, such as forks, arms, claws, etc.

The upper pressing plate 10 is mounted on a support plate 28, which is part of the support members 26, and is movable toward the object 1 to be gripped between an open position (as shown in FIG. 7) and a gripping position. The support plate 28 is rigidly fixed onto the support plate 4 at a right angle. Similarly as explained above in the case of the lower pressing plates 8, 9, the upper pressing plate 10 may have several suitable shapes, such as forks, arms, claws, etc. An actuator, such as a pneumatic piston and cylinder arrangement 32 (see FIG. 7), is mounted between the upper pressing plate 10 and the support plate 28. This actuator 32 moves the upper pressing plate 10 between the open position and the gripping position, and thereby grips the object 1 between the upper and lower pressing plates 8, 9, 10.

Of course, as it will be apparent to those skilled in the art, many modifications can be done on the configuration described above. Indeed, the position of the different support members 26 can be varied according to other design configurations.

The clamp 20 and robotic arm 24 of the present invention are further coupled to a controller or a computer module so as to receive detection signals from the sensors and for operating the actuators, as will be described below.

Preferably, and as is known in the art, detectors may be included in the robotic system for detecting abnormalities of operation and for stopping the robotic arm 24 in the event of false movements or damage of an object.

Referring to FIGS. 3, 4, 5 and 6, the clamp 20 and robotic arm 24 is operated to perform the following basic steps in order to grip the object 1:

sequentially moving the end 22 of the robotic arm 24 in horizontal step movements toward the object 1 to be gripped and in vertical up and down step movements until the first pressing plate 8 touches a separator 2 positioned under the object 1 to be gripped;

inserting the first lower pressing plate 8 under the object 1 to be gripped;

inserting the second lower pressing plate 9 under the object 1 to be gripped after the first lower pressing plate 8 has been inserted under the object 1 to be gripped; and lowering the upper pressing plate 10 toward the object 1 to be gripped, thereby gripping the object 1 between the upper and lower pressing plates 8, 9, 10.

Figure 3:
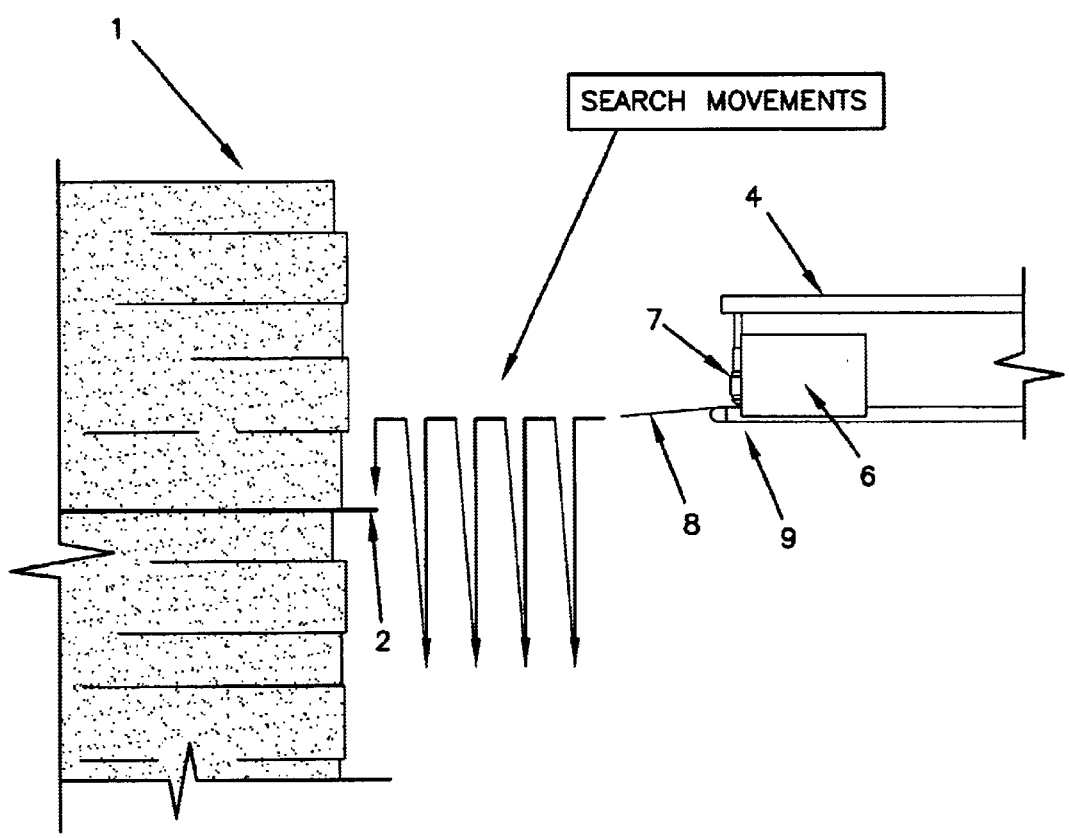
FIGS. 3, 4, 5 and 6 are side views illustrating the steps of a method for operating the clamp shown in FIG. 2 with respect to the pile shown in FIG. 1, according to a preferred embodiment of the present invention.

Preferably, the clamp 20 can also be provided with an optical sensor 5 and a laser sensor 6. These sensors 5, 6 are used for approaching the end of the robotic arm 24 towards the object 1 to be gripped. In effect, by means of the optical sensor 5, the robotic arm 24 carries out a vertical tracing over the left corner of the pallet 3 (see FIG. 1). This tracing routine allows a robotic system to read the height along the Z direction over the pile and to deduce the X and Y positions by means of its internal references. The approximate dimensions of the pile of articles 1 on the separator 2 being known parameters, a controller coupled to the robotic arm 24 calculates the position of the separator 2 and positions its clamp 20 approximately as shown in FIG. 3 so that the edge of the first lower pressing plate 8 is close to the separator 2. Then, by means of the laser sensor 6, the robotic system validates the horizontal position of the pile and approaches the first lower pressing plate 8 of the clamp 20 towards the pile, while always remaining away from the separator 2.

Figure 4:
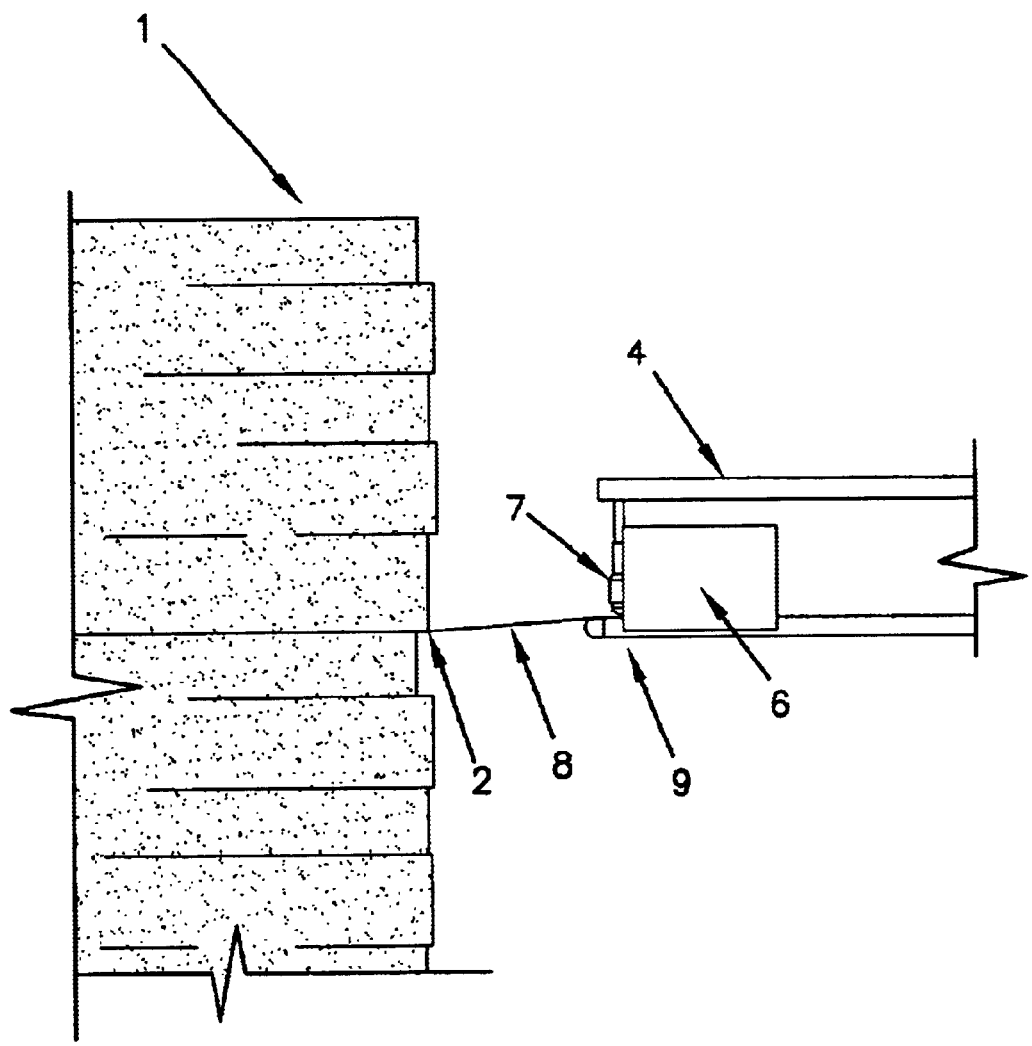

Preferably, once the robotic arm 24 is thus positioned, the robotic system begins a precise search routine for the separator 2 as described above. This routine consists in making, as shown in FIG. 3, a small movement horizontally towards the pile followed by a small movement vertically from top to bottom. After this last movement, the robotic system verifies if the proximity sensor 7 is activated by the deformation of the edge of the first lower pressing plate 8 touching the separator 2, as shown in FIG. 4. If the proximity sensor 7 is not activated, the robotic arm 24 brings up the clamp 20 to the initiating height and repeats the search routine until the proximity sensor 7 is activated.

Figure 5:
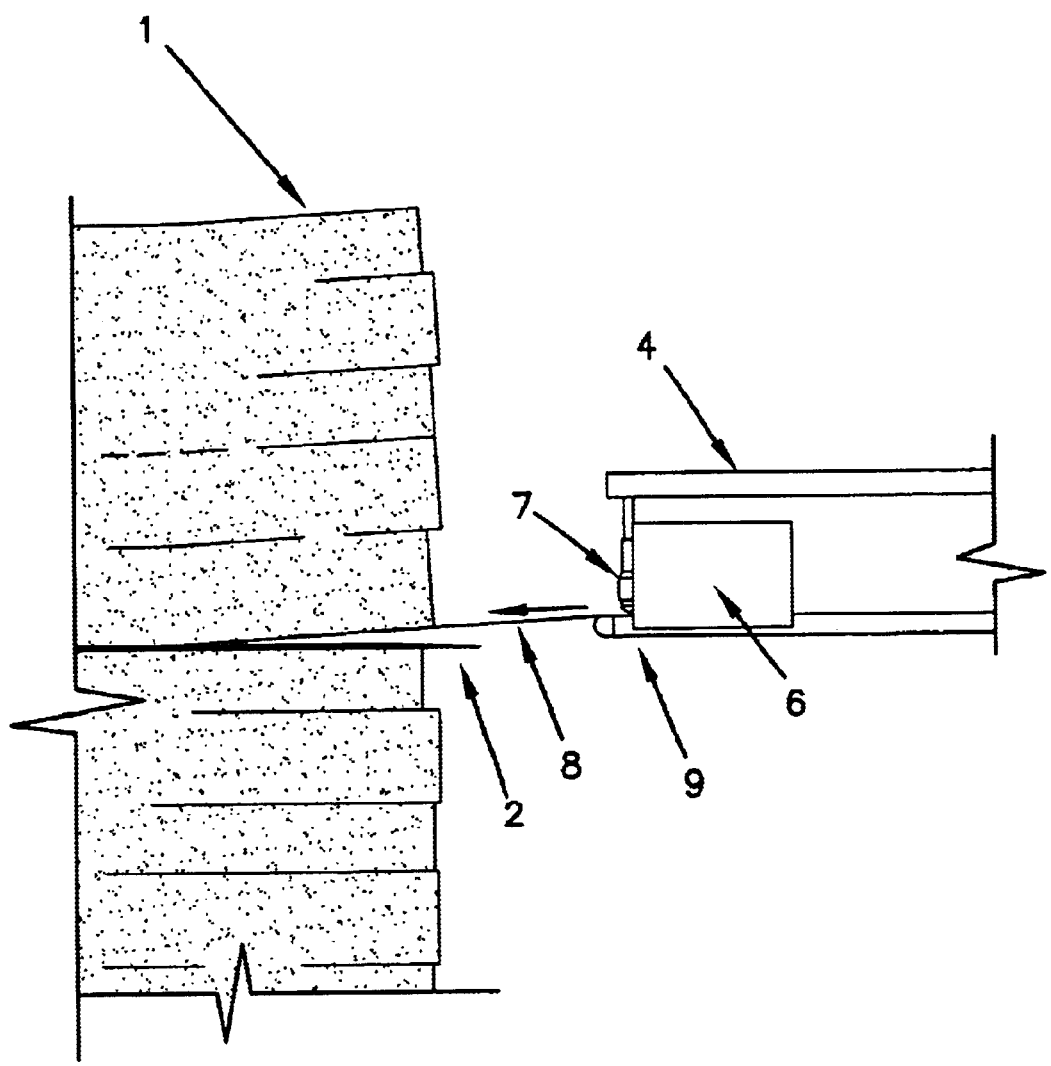
Figure 6:
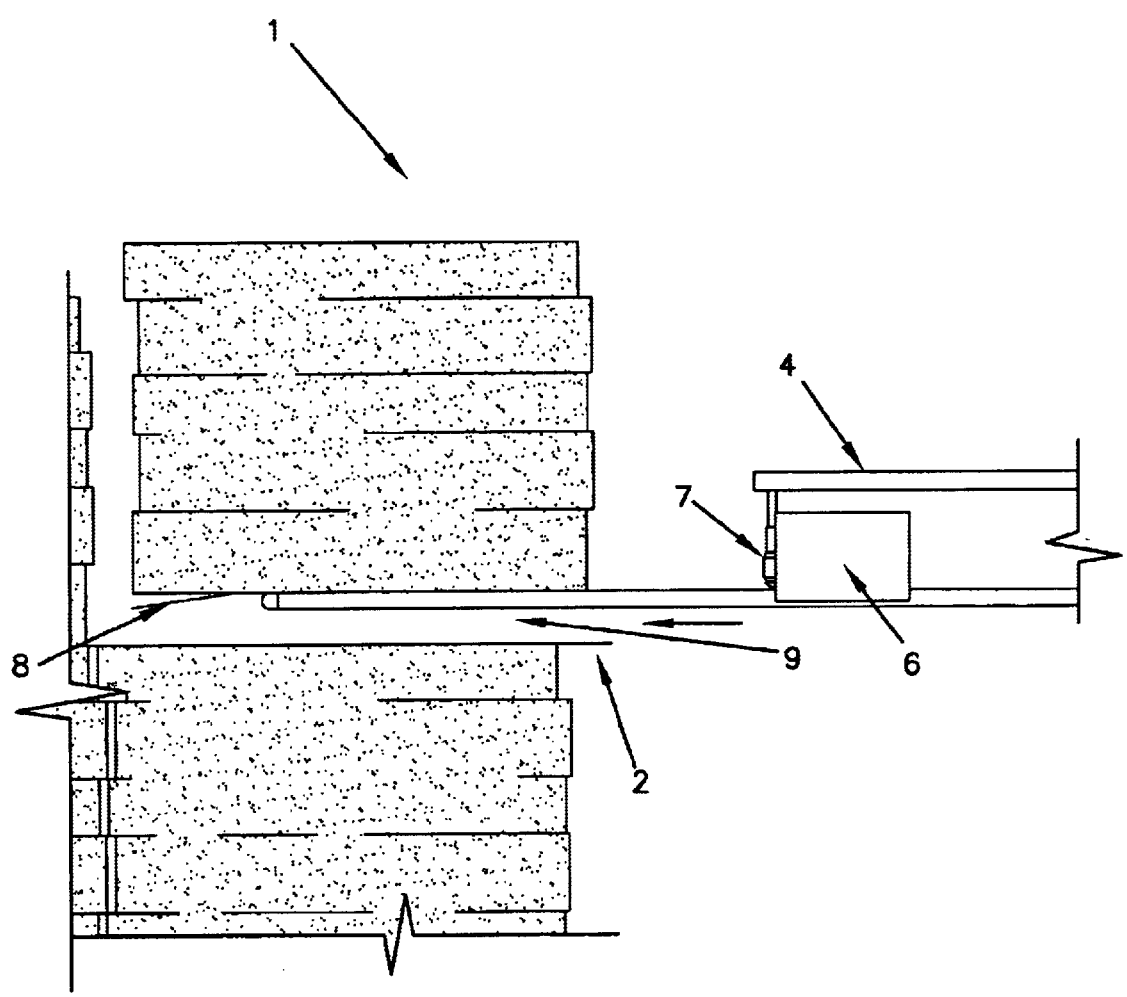

Preferably, after the precise localization of the separator 2, the robotic arm 24 brings forward the first lower pressing plate 8 of the clamp 20 by means of the pneumatic piston and cylinder arrangement 30 in order to insert it under the pile, between the last article 1 of the pile and the separator 2, as shown in FIG. 5. The robotic system then actuates the second lower pressing plate 9 of clamp 20 by means of the pneumatic cylinder and piston arrangement 31 in order to insert it under the first lower pressing plate 8, as shown in FIG. 6. At the same time that the second lower pressing plate 9 is inserted, the robotic system actuates the clamping plate 10 shown in FIG. 7 by means of the pneumatic cylinder and piston arrangement 32 in order to apply a certain pressure on the top of the pile in order to maintain the articles 1 in place and prevent unwanted displacements. Once the robotic arm 24 has completed the prehension cycle with its clamp 20, it can then displace the article 1, or pile of articles 1, and lay it down at a precise location.

Preferably, since there may be several rows of articles on the separator 2, the prehension cycle is repeated until the robotic arm 24 has removed all the articles 1 lying on the separator 2. When there are no more piles on the separator 2, the robotic arm 24 removes and discards the separator 2 by means of the suction cups 11 of the clamp 20. In order to do so, the robotic arm 24 positions the clamp 20 over the separator 2 and elevates the clamp 20 by means of another cylinder and piston arrangement 33 mounted on a movable support plate 27 which is slidably connected to support plate 28. When the clamp 20 is elevated by the cylinder and piston arrangement 33, the suction cups 11 can touch the separator 2 by lowering the robotic arm 24. Using suction, the suction cups raise the separator 2. The robotic arm 24 can then displace the separator 2 and lay it down at a precise location. These steps are repeated until there are no more articles 1 on the pallet 3.

As will be apparent of those skilled in the art, and similarly to what is disclosed in U.S. Pat. No. 4,993,915 by Berger, several clamps 20 according to the present invention may be mounted on a robotic arm in order to grab an entire row of articles simultaneously. In addition, the robotic arm 24 of the present invention is also intended to cover such carriage assembly and support rail of U.S. Pat. No. 4,993,915 by Berger.

In an alternative embodiment of the present invention, the objects to be gripped are not separated by separators 2, but are separated by a space sufficiently large to allow insertion of the first lower pressing plate 8 under the object. These objects can be for example corrugated cardboard boxes which, when piled up, have spaces in between them. The clamp 20 is modified because there is no need for the tactile sensor 7, but instead a force sensor coupled to the actuator 30 of the first lower pressing plate 8 is used. This sensor measures a horizontal reaction force exerted on the first lower pressing plate 8. If the lower pressing plate 8 touches the object 1 head on, the sensor detects a very large force as compared to when the first lower pressing plate 8 is inserted in between two cardboards where almost no force is detected.

Accordingly, referring to FIGS. 1 and 7, a second method of operating the clamp 20 and robotic arm 24 is performed by the following steps in order to grip the objet 1:

- moving the end of the robotic arm 24 toward the object 1 to be gripped until the first pressing plate 8 is in proximity of the object 1 to be gripped;
- partially inserting the first lower pressing plate 8 under the object 1 to be gripped;
- detecting if a reaction force exerted on the first lower pressing plate 8 is below a predetermined threshold;
- further inserting the first lower pressing plate 8 under the object 1 to be gripped if the reaction force exerted on the first lower pressing plate 8 is below the predetermined threshold;
- inserting the second lower pressing plate 9 under the object 1 to be gripped after the first lower pressing plate 8 has been further inserted under the object 1 to be gripped; and
- lowering the upper pressing plate 10 toward the object 1 to be gripped, thereby gripping the object 1 between the upper and lower pressing plates 8, 9, 10.

In another alternative embodiment used when the objects to be gripped are not separated by separators 2, a positioning sensor or horizontal displacement sensor is fixed to the pneumatic cylinder arrangement 30 of the first lower pressing plate 8 and the proximity sensor 7 is kept. Thereby, the position of the first lower pressing plate 8 in the pile can be known by the robotic system by means of this positioning sensor. The robotic system can determine the penetration distance of the first lower pressing plate 8 in the pile during the insertion and determine if the insertion is successful or not. In a first step, the first lower pressing plate 8 is moved toward the object 1 with a small force or speed so as not to bend or damage the first lower pressing plate 8 if it hits the object head on. If the insertion is not successful, the robotic arm 24 removes the first lower pressing plate 8 from the pile, raises or lowers the clamp 20 with a certain increment and restarts the insertion of the first lower pressing plate 8. If the positioning sensor on the pneumatic cylinder and piston arrangement 30 detects that a certain distance has been reached and that the proximity sensor 7 did not detect a deformation of the first lower pressing plate 8 or is within an acceptable threshold, then a stronger force can be exerted on the first lower pressing plate 8 in order to extend it to its maximum. This particular embodiment also allows not using the separators 2 between the layers of the piles, provided that the articles forming the pile are of a minimal thickness. The positioning sensor and proximity sensors accomplish the same object as the force sensor mentioned above as both will detect the results of a reaction force being exerted on the first lower pressing plate 8.

The present invention provides a depalletizing tool that is more efficient than manual methods for unstacking objects and that does not put workers' health at risk. In particular, the depalletizing tool eliminates repetitive manual movements that may cause back problems and chronic illnesses such as bursitis and tendinitis. Furthermore, the present invention provides a depalletizing tool that is less costly to operate than most other prior art devices.

Although a preferred embodiment of the present invention has been described in detail herein and illustrated in the accompanying drawings, it is to be understood that the invention is not limited to this embodiment and that various changes and modifications may be effected therein without departing from the scope or spirit of the present invention.

What is claimed is:

1. A gripping and transport clamp mounted at an end of a robotic arm being movable towards an object to be gripped, comprising:

a support member mounted at the end of the robotic arm;

a first lower pressing plate mounted on the support member, the first lower pressing plate being shaped for insertion under the object to be gripped;

sensor means adapted for detecting a reaction force being exerted on the first pressing plate upon displacement thereof;

first actuating means for inserting the first lower pressing plate under the object to be gripped in response to a detection of the reaction force by the sensor means;

a second lower pressing plate mounted below the first lower pressing plate on the support member, the second lower pressing plate being movable between a retracted position and an extended position;

second actuating means mounted between the second lower pressing plate and the support member for moving the second lower pressing plate between the retracted position and the extended position, thereby inserting the second lower pressing plate under the object to be gripped in response to the first lower pressing plate being inserted under the object to be gripped;

an upper pressing plate mounted on the support member, the upper pressing plate being movable toward the object to be gripped between an open position and a gripping position;

third actuating means mounted between the upper pressing plate and the support member for moving the upper pressing plate between the open position and the gripping position, thereby gripping the object between the upper and lower pressing plates; and control means for receiving detection signals from the sensor means and for operating the actuating means.

2. The clamp according to claim 1, further comprising discarding means for eliminating a separator positioned under the object to be gripped.

3. The clamp according to claim 1, wherein the first lower pressing plate is made of a thin and flexible metal plate.

4. The clamp according to claim 1, further comprising an optical sensor and a laser sensor for moving the end of the robotic arm in proximity with the object too be gripped.

5. The clamp according to claim 1, wherein the sensor means comprises a horizontal displacement sensor connected to the first actuating means for detecting an insertion of the first lower pressing plate under the object to be gripped.

6. The clamp according to claim 5, wherein the first actuator means comprises an actuator mounted between the first lower pressing plate and the support member for moving the first lower pressing plate between a retracted position and an extended position with the first lower pressing plate being inserted under the object to be gripped.

7. The clamp according to claim 6, wherein the actuator comprises a pneumatic cylinder and piston arrangement.

8. The clamp according to claim 1, wherein the sensor means comprises a tactile sensor connected to the first pressing plate for detecting a deformation of the first pressing plate in response to the first pressing plate touching a separator positioned under the object to be gripped.

9. The clamp according to claim 8, wherein the tactile sensor comprises an inductive proximity sensor.

10. The clamp according to claim 8, wherein the first actuator means comprises an actuator mounted between the first lower pressing plate and the support member for moving the first lower pressing plate between a retracted position and an extended position with the first lower pressing plate being inserted under the object to be gripped.

11. The clamp according to claim 10, wherein the actuator comprises a pneumatic cylinder and piston arrangement.

12. A method for gripping an object with a clamp mounted at an end of a robotic arm, the clamp having a first lower pressing plate and second lower pressing plate below the first lower pressing plate, and an upper pressing plate, the method comprising the steps of:

sequentially moving the end of the robotic arm in horizontal step movements toward the object to be gripped and in vertical up and down step movements until the first pressing plate touches a separator positioned under the object to be gripped;

inserting the first lower pressing plate under the object to be gripped;

inserting the second lower pressing plate under the object to be gripped after the first lower pressing plate has been inserted under the object to be gripped; and lowering the upper pressing plate toward the object to be gripped, thereby gripping the object between the upper and lower pressing plates.

13. A method for gripping an object with a clamp mounted at an end of a robotic arm, the clamp having a first lower pressing plate and second lower pressing plate below the first lower pressing plate, and an upper pressing plate, the method comprising the steps of:

moving the end of the robotic arm toward the object to be gripped until the first pressing plate is in proximity of the object to be gripped;

partially inserting the first lower pressing plate under the object to be gripped;

detecting if a reaction force exerted on the first lower pressing plate is below a predetermined threshold;

further inserting the first lower pressing plate under the object to be gripped if the reaction force exerted on the first lower pressing plate is below the predetermined threshold;

inserting the second lower pressing plate under the object to be gripped after the first lower pressing plate has been further inserted under the object to be gripped; and lowering the upper pressing plate toward the object to be gripped, thereby gripping the object between the upper and lower pressing plates.

14. The method according to claim 13, further comprising the step of detecting if a horizontal displacement of the first pressing plate is above a predetermined distance.

* * * * *